United States Patent Office 2,748,782
Patented June 5, 1956

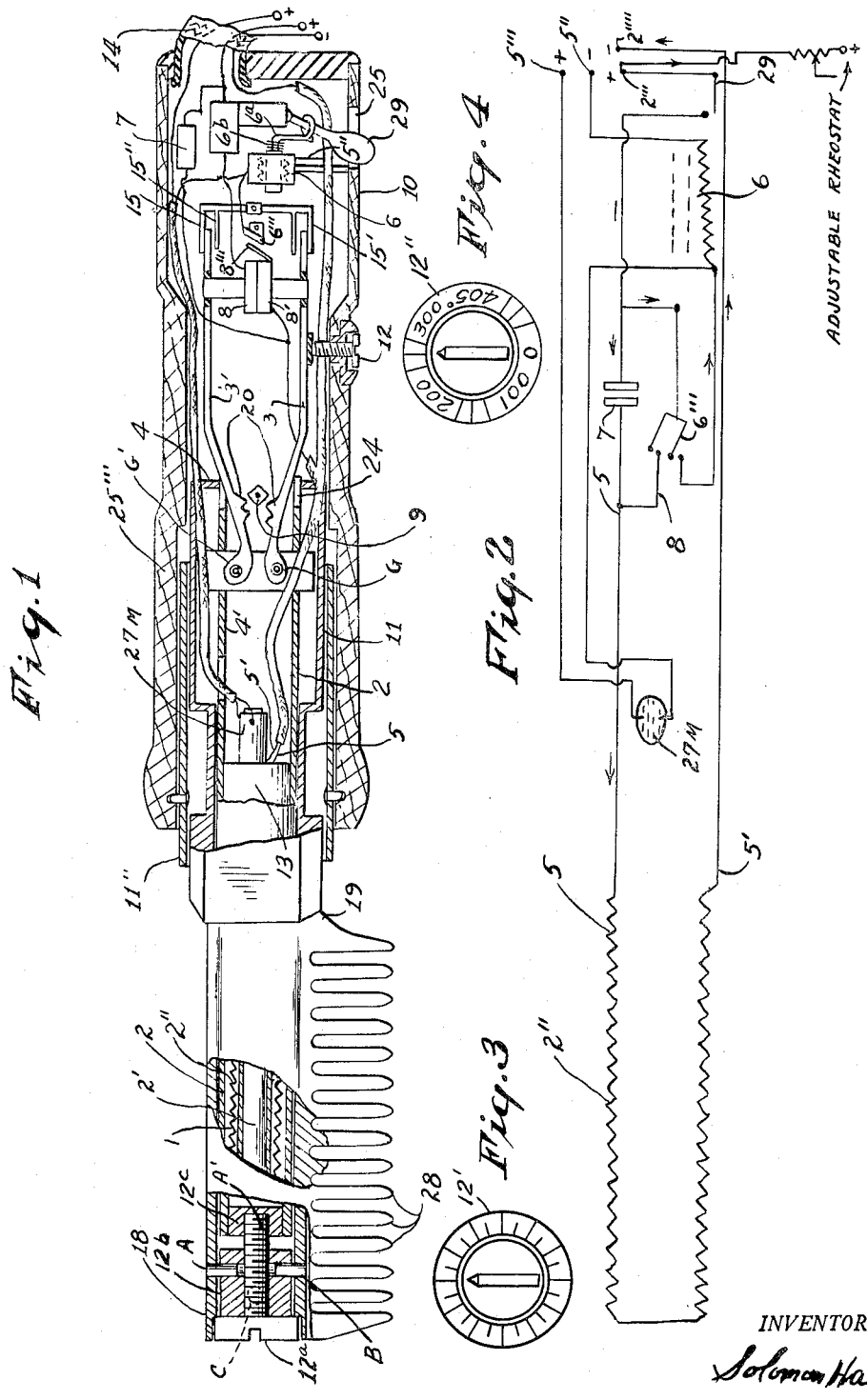

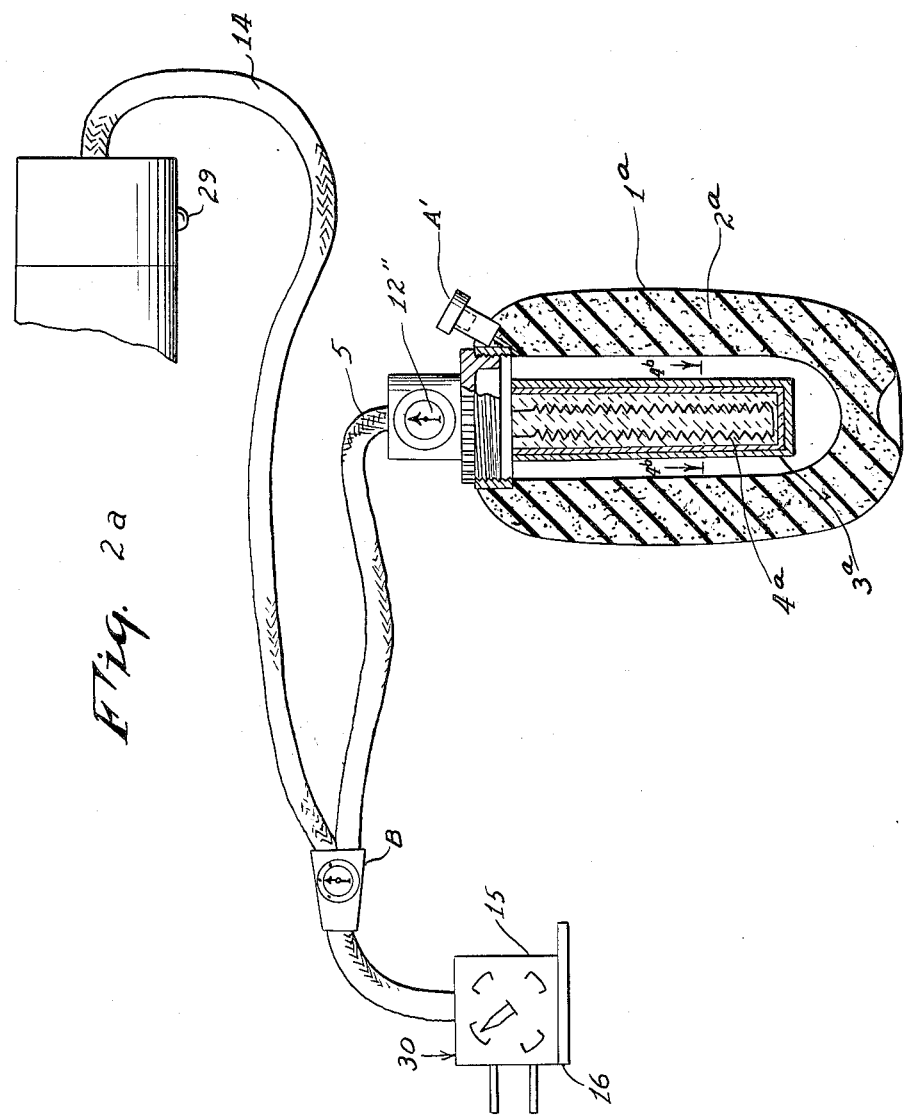

2,748,782

MERCURY SWITCH-INDUCTOR THERMOSTAT CONTROLLED ELECTRIC HAIR TREATING IMPLEMENT

Solomon Harper, New York, N. Y.

Application June 2, 1951, Serial No. 229,583

9 Claims. (Cl. 132—118).

This invention relates to improvements in mercury switch-inductor thermostat controlled hair treating implements comprising a comb, a mercury switch, a second switch and a magnetic inductor, a thermostat which may be used in other articles, implements, machines and devices.

An improved thermostat is adapted to open contacts quickly in a jump or snap open fashion without grooved parts being affected directly by heat of the heating element within an inner tubular heated part of a tool.

A mercury switch connected to a first source of electric energy and with contacts disposed in the comb and when closed will cause a magnetic inductor to open a second source of electric energy circuit in series with a heating element and the thermostat, and so arranged that the inductor can be energized by the mercury switch or by the longitudinal movement and expansion of the inner tubular part and grooved parts and by passage of electric current from a contact on one of the grooved parts engaging a contact connected to the inductor.

Means by which an operator may see heat indicating dials and regulate the approximate heat of the tool for the type of work being done are provided by adjusting the setting of the thermostat; or reducing the heating capacity of the heating element; by reducing the amount of electrical energy passing around points of the thermostat directly into the heating element thus combining the regulation of power by the mercury switch, the thermostat and the dialed adjustable resistance control.

Unlike my other inventions this has a quick snap action and does not depend upon bi-metal movement for the make and break contacts of the thermostat. While I show a capacitor, the use of it is not necessary when the inductor and the mercury switch are used as a unit with the thermostat because the movement of one of the arms of the grooved parts causes the inductor to be energized after a predetermined expansion of the respective parts or should the mercury switch and thermostat fail the operator can turn the power off by manual means; such a "possibility" is not probable. A manual switch which is connected to the inductor is generally used to cut off the power thru the points of the thermostat and allow the tool to be heated by a main independent current thru a rheostat when more than one heating element is used.

Having described the general operation of my invention, the following are some of the uses for which my device is designed. The tool or comb can be used for drying, straightening and curling hair, both for regular and for permanent types of work, it can be used to bake plastic like substances around strands of hair and make them water proof, that is, non absorbent for a time until the coating wears off or is removed.

The following is a brief description of the several figures of the drawings:

Fig. 1 is a side elevation, partially in section of improvements in electrical hair treating implements thermostatically operable.

Fig. 2 is a diagram of circuits to a mercury switch and inductor, and also a separate circuit to the heating means in the tubular inner part.

Fig. 3 is an end view of one of two temperature regulating dials used to adjust the electric switching means; also of the position of an adjusting screw.

Fig. 4 is a view of the other of the dials.

Fig. 2a shows the end of a comb and a hot water bag connected to a rheostat.

Fig. 4a shows a cross-section of a heater tube surrounding an insulation core, the latter having a central hole for the passage of the mercury switch stem and.

Fig. 4b shows a cross-section of a heater tube taken on line 4b—4b of Figure 2a.

Having described the figures in this application, the detailed description follows:

In Fig. 1, 1 shows a sectional view of the heater tube inside the comb, 2 shows the inner tubular part; 2' shows the stem of the mercury switch, 2" is the heating element, 3 and 3' are edges of grooved parts of the thermostat, and they are separated by a diamond pointed wedge 9 adjacent to grooved extension parts. The grooved parts are hinged at G and G', pins extend thru holes in the grooved parts at revolvable points; the grooved parts revolve laterally in opposite directions to each other, move and expand longitudinally simultaneously with their lateral movement. The grooved parts move laterally against spring arms 15 and 15' secured to the sides of the handle end of the comb by a cross pin extending thru the connecting vertical part of the springy arms at the end of the arms 3 and 3'. These springy arms extend over and under each flat side of the ends of 3 and 3' to provide immediate return of the arms 3—3' to close circuit position as soon as the temperature drops to a predetermined point, also insures arms moving in a predetermined direction. The springy arms 15 and 15' are stationarily mounted. Contact 6''' is mounted on the center of the vertical part. In Fig. 1, 4 is the end of the outer tubular part. The inner tubular part or heater tube 4' is made of a material which expands faster than the metal comb and outer tubular part 11 do. Diamond pointed piece 9 is centered between or adjacent to the grooves 20 of grooved parts 3—3', as may be determined; hence when the grooved parts are pushed against the sharp piece 9 the grooved parts move laterally, about their hinged pivots at G—G' and will tend to move spring arms 15, 15' likewise. The lateral movement of 3, 3' being restrained by arms 15, 15' will cause the grooves 20 to remain in contact with 9 longer than would be if there were no springy parts, 15, 15'; finally after enough lateral and longitudinal pressure has been developed by the expansion of the inner tubular part of the comb in 11, the grooves will jump snap over the sharp ends of 9 and thus cause a snap open action of 3, 3' to a greater degree than the slow make and break action of arms being a part of a rod, as shown in Patent No. 1,663,078 or slow action bi-metal types.

5 shows (in Fig. 1), the entrance points of the circuits into the insulation core of tube 2, the core does not extend out to the end of tube 2, and the heating elements do not extend beyond the end of the combing section of the comb, in fact is not as long as the metal back of the comb. The core extends only far enough to act as a kind of heat insulator for the sides of the comb handle. 6 shows a magnetic inductor, and is connected in series with grooved part 3 contact piece 8' thru insulated electric contact 6''' which is contacted by 8''' whenever grooved part 3 expands and moves longitudinally far enough to carry and push 8''' on to 6''', the contacting causes the inductor 6 to be energized jointly by connecting the second source of energy circuit thru contact 8 should there be no opening of 8 and 8'.

7 represents a capacitor connected around contacting points 8 and 8' secured to ends of grooved parts and aids in preventing excessive arcing and supplementing the snap action caused by the operation of 20 and 9, thus, there are a plurality of safety measures incorporated. The mercury switch 27M, is also connected in series with inductor 6; therefore the efficiency of this device cutting off the heating supplementary element is assured.

8 and 8' are contacts properly insulated from arms 3—3', and unlike other installations of points or studs, at the ends of grooved parts or strips, the studs and tips are placed at a predetermined distance back from the ends of 3—3' which are bracketed between spring parts 15, 15', allowing the sides of the contacts and 8''' safe clearance from the extension piece tips of 15, 15'. Positive electric power passes thru 8 to 8' thence by heat insulated wires to the heating element 2'' within the core 13. In Fig. 1, 9 is secured by a cross pin to the sides of tube 11 near 4, piece 9 being made nearly as sharp as the width of the grooves 20. The operation of the adjustment of the heat of the comb is attained by the following action: The expansion of the outer tubular part 18 and 11 is less than 2. Pressure on 3 between G and 8' is attained by manually turning insulated adjustment dialed screw 12 within dial 12''. The operator can adjust the spacing between contacts 8' and 8, thus reducing the resistance to "snap open," which is caused by the longitudinal and lateral pressure of the grooved parts on the diamond wedge 9. The lateral movement is also retarded by springy parts, 15—15'. The operation of the mercury switch, the inductor and the grooved parts 3—3' may not cut off all of the power when more than a single heating means is used. For permanent type of hair dressing, which requires a very fine control of the heating resistances, it is necessary that the expansion of the outer tubular part 18 and part 11 be less than that of tubular part 2. The hair is subjected to be dried correctly upon contact with that section adjacent to the teeth, and this is also why a mercury switch 27M is used. To have the mercury switch cut off the power thru the inductor almost immediately is dependent upon maximum temperature of the comb. For efficient operation, the smaller the size of the grooves 20 and the points of 9 the greater the efficiency will be. The drawings show a magnified and enlarged dimension of the points and the grooves.

In Fig. 1, 11 represents a sleeve with a reduced middle section and the inside dimension is slightly larger than the outside diameter of 2. The end of tube 11 adjacent to the comb back being enlarged to slide inside of tube 11'' which is secured by dowel pins to the handle part of the comb; 11'' and 11 being close together, for thus insuring longitudinal movement of 2 without wobbling effects at the carrying head for G and G' and the snap open actions of 9 and 20. The proper shape of arms 3—3', bent in a Y shape declining to G—G', are parallel for the majority of their length, this is also a part of the necessary calibration.

In Fig. 1, 12'' is calibrated, as shown in Fig. 4; see also the dial of the hot water bag in Figure 2a. 14 shows the incoming electric conductors entering the back of the handle.

Figure 1 also shows an adjusting screw 12a having the threaded stem A'. The threaded stem is threaded to an outer plug 12b and to an inner plug 12c, such inner plug being connected to and cause the heater to be moved longitudinally when screw 12a is turned to cause grooves 20 to contact 9 proportionally to the requirement of expansion and movement of 2 to snap grooves outward to open contacts 8 and 8'. The pins A, B prevent the plug 12b from movement.

Contact 6''' has a wiping face, that is, a special facing for the contacts. A is a pin which insures correct holding of the plug 12b and the outer tubular part 18 together, and insures correct expansion of tube 2 and tubular part 18, which does not extend as far out as the end of tube 2. 19 shows the junction between tube 11 and the back part. 20 are the grooves or slots described herein before. 24 shows an air inlet hole or slot in the side of 4'; other slots are provided for the passage of the common wire return of power passing thru switch 2'—27M. 25''' represents the larger part of the handle. 25 represents a slot (small) in the handle to permit switch handle 29 to swing freely for cutting off and on operations by the operator and automatic cutting off the main power by inductor 6.

27M shows the end of the mercury switch inside tube 2. 28 is a plurality of comb teeth. 29 is a snap action second switch handle, the base of the switch being inside the handle and a looped piece 6a of non-magnetic material is attached to the core of inductor 6 and is looped around the stem or handle of the second switch, and the looped part so calibrated that when 6 is energized, the core will move toward the front of the comb and snap the second switch off quickly, to prevent the switch from arcing.

6b is a tension spring around looped piece 6a, and 1a shows a side elevation of the hot water bag. The operation controls of this invention, having been described,

I claim:
1. In an electrical hair treating implement, an inner tubular part having electrical heating means and an outer tubular part constituting a pair of parts, said pair of tubular parts having different coefficients of expansion, said inner tubular part being movable longitudinally in said outer tubular part, a pair of longitudinally movable and heat expandable grooved parts connected to said inner tubular part, electric switch contacting means connected to and positioned between said grooved parts, said grooved and tubular parts adapted to be operable when said electric heating means are connected to a source of electric energy, means for connecting said heating means of said inner tubular part to and from a source of electric energy, a pointed separating means disposed between said grooved parts, means for hingedly connecting said grooved parts to said inner tubular part temperature adjustable indicating means connected to said tubular parts, and means for adjusting the longitudinal movement of said inner tubular and grooved parts with respect to said separating means, said parts adapted to cool contact and cause said electric contacting means to close electric points.

2. In an electrical hair treating implement according to claim 1, wherein said temperature indicating means comprises a plurality of indicating dials, and a plurality of adjustable indicating means for said dials.

3. In an electrical hair treating implement according to claim 2, wherein one of said adjustable means is positioned at one end of said tubular parts and the other adjustable means is positioned adjacent one of said grooved parts.

4. In an electrical hair treating implement, according to claim 1, wherein said points of the separating means fit into the grooves of said grooved parts so that when said inner tubular part expands and moves longitudinally for a short distance towards said separating means, said grooved parts will be caused to snap open at end and groove over said points of said separating means for a predetermined distance.

5. In an electrical hair treating implement, a comb having a mercury switch with contacts disposed in said comb, said contacts being connected to a first source of electric energy, a magnetic inductor connected in series with said contacts and with said source of electric energy, a second switch having manually operable means connected to said inductor, said inductor being adapted to cause said second switch to become mechanically operable when said contacts are closed, said comb having a pair of tubular parts, one of said tubular parts being an inner part, and the other being an outer part, said inner part being movable longitudinally in said outer part, said inner part having electric heating means connected to a second source of electric energy, said electric heating means being adapted to heat the inner tubular part, the outer part, the mercury switch and the comb at the front part, said front part being the hair contacting surface of said comb, said electric mercury switch will cause said contacts to become closed when said comb is heated to a predetermined maximum high temperature.

6. In an electrical hair treating implement according to claim 1, wherein said inner tubular part and said grooved parts when heated expand and are adapted to be moved longitudinally in the same direction simultaneously and cause said grooved parts to come into contact with said separating means, said electric heating means heating said tubular parts will cause said inner tubular part and grooved parts to expand toward said points and after an increased pressure longitudinally of said grooved parts will also cause a pair of said grooves to snap past said points for a small distance.

7. In an electrical hair treating implement according to claim 1, a connecting piece for connecting said grooved parts and said inner tubular part hingedly together, said inner tubular part extending in said outer tubular part in such a manner as to be guided longitudinally inside the inner wall of said outer part, extension and enlarged means around said inner tubular part being adapted to guide said longitudinal and expansion movement of said inside tubular part.

8. In an electrical hair treating implement according to claim 1, said grooved parts being connected and hinged at one end to said inner tubular part, and the other end having spring means adapted to retard movement of said grooved parts from moving beyond a predetermined distance into and out of contacting relation between said grooved parts and said points; said electric contacting means connected and positioned between said parts being adjustable to make and break an electric circuit to said electric heating means proportionally to pressure of said spring means against said grooved parts and the longitudinal position of said grooved parts with respect to said separating means, said adjusting means comprising a plurality of adjusting screws centered within said temperature indicating means.

9. In an electrical hair treating implement, according to claim 5, said inner tubular part having adjusting means at one end with hinged grooved means at the other end and is adapted to be adjusted longitudinally within said outer tubular part, a grooved part having an electric contact thereon to conduct electric energy, said latter contact being near a stationary held contact connected to said inductor, said second source of electric energy being adapted to pass thru said contacts, said grooved part contact and contact connected to said inductor being adapted to contact each other when said inner tubular part and grooved part move and expand a predetermined distance.

References Cited in the file of this patent

UNITED STATES PATENTS

| 1,663,078 | Harper | Mar. 20, 1928 |
| 2,152,583 | Conill | Mar. 28, 1939 |
| 2,600,472 | Brock | June 17, 1952 |

FOREIGN PATENTS

| 589,911 | Great Britain | July 3, 1947 |